United States Patent [19]
Cok

[11] Patent Number: 5,555,194
[45] Date of Patent: Sep. 10, 1996

[54] CLONING TECHNIQUE FOR DIGITAL IMAGE RETOUCHING

[75] Inventor: David R. Cok, Rochester, N.Y.

[73] Assignee: Eastman Kodak Company, Rochester, N.Y.

[21] Appl. No.: 280,700

[22] Filed: Jul. 26, 1994

[51] Int. Cl.⁶ .................................................. G03C 7/18
[52] U.S. Cl. ..................................... 364/526; 382/254
[58] Field of Search ............................... 364/526; 382/23, 382/54, 27; 358/500, 531, 523, 518, 530; 345/150, 157; 395/130, 131

[56] References Cited

U.S. PATENT DOCUMENTS

| | | |
|---|---|---|
| 4,127,871 | 11/1978 | Sakamoto . |
| 4,393,399 | 7/1983 | Gast et al. . |
| 4,476,487 | 10/1984 | Klie et al. . |
| 4,488,245 | 12/1984 | Dalke et al. . |
| 4,516,155 | 5/1985 | Hennig et al. . |
| 4,577,219 | 3/1986 | Klie et al. . |
| 4,602,294 | 7/1986 | Yamada . |
| 4,617,592 | 10/1986 | MacDonald ............................ 358/531 |
| 4,727,425 | 2/1988 | Mayne et al. .......................... 358/523 |
| 4,794,382 | 12/1988 | Lai et al. . |
| 4,829,370 | 5/1989 | Mayne et al. . |
| 4,893,181 | 1/1990 | Yeomars ................................. 358/531 |
| 4,956,704 | 9/1990 | Yamada . |
| 5,036,405 | 7/1991 | Kojima . |
| 5,054,100 | 10/1991 | Tai . |
| 5,109,481 | 4/1992 | Lathrop et al. . |
| 5,111,286 | 5/1992 | MacDonald et al. . |
| 5,130,789 | 7/1992 | Dobbs et al. ......................... 358/500 |
| 5,155,588 | 10/1992 | Levien . |

Primary Examiner—Emanuel T. Voeltz
Assistant Examiner—Thomas Peeso
Attorney, Agent, or Firm—Raymond L. Owens

[57] ABSTRACT

A pixel cloning technique allows for digital image retouching of a digital image. Initially, a cloned area and a surround area are determined. Using the image pixel values, the mean, slope, and quadratic coefficients in each color are computed for the cloned area and the surround area, and, if desired, for subregions of the surround. If subregions are used, it is determined which subregion of the surround deviates the least from the functional model. The values of the cloned pixels are adjusted so that their mean, slope, and quadratic term match the mean, slope, and quadratic term of the surround, or of the best fitting subregion of the surround.

20 Claims, 5 Drawing Sheets

CLONING TECHNIQUE FOR DIGITAL IMAGE RETOUCHING

TECHNICAL FIELD

The present invention is directed to the field of cloning in editing and retouching digital images and, more particularly, to a method for automatically adjusting copied pixels to more nearly match surrounding pixels.

BACKGROUND ART

Images photographed on film often need retouching before they can be used in a setting requiring high quality imaging. One task addressed by such retouching is removing localized blemishes from the image. These blemishes may be part of the original image, such as undesired marks on skin, or they may have been introduced by the photographic process, such as dust or scratches. In non-electronic image manipulation, this retouching is typically performed by air-brushing.

The digital analogue of air-brushing is pixel cloning. This is an operation which is common to most digital image editing software packages. Cloning consists of copying pixels from one part, the source area, of the image to another part, the destination area, of the image. The copying takes place in a small region in the neighborhood of the cursor on the screen, under the control of the computer mouse or other pointing device. Thus the operation is completely under the interactive control of the operator, and the operator can easily change the relative offset between the source area and the destination area. Typically, as the user moves the computer mouse, the location of the source area moves along with the location of the destination area, maintaining a fixed offset between them, with pixels being copied as the operator moves the mouse. It is time-consuming partly because of the need to select source areas for the clone which closely match the color and brightness of the area surrounding the destination.

The copying may be done either to cover over some unwanted object in the destination area of the image, such as blemishes as mentioned above, or to make a copy in the destination area of an object in the source area. In general, but especially in this latter application, the source area may come from another image entirely. In preparing images for professional use, cloning consumes a large part of the time an operator spends working on an image.

Variations on cloning techniques allow for different brush shapes, i.e., the shape of the area which is copied. The shape may be predefined, for example rectangular or circular, or be user-defined. In addition, some randomness can be added to the copying operation to simulate the random nature of true air-brushing, as disclosed in commonly assigned patent application Ser. No. 746,664, now U.S. Pat. No. 5,276,510, incorporated herein by reference.

With a real air-brush, the depositing of ink occurs continuously as the operator moves the air-brush. In a digital system, the location of the mouse is only reported at discrete time intervals. Thus a high quality system will interpolate between the reported locations in order to simulate the smooth movement of the pointing device.

In U.S. Pat. No. 4,577,219, retouching of a color image by copying pixels from one area to another is disclosed. In the '219 patent, original color signals are obtained by scanning of the color image, and then converting the original color signals into color values for a variety of different color components of the color signals. However, the '219 patent only discusses copying pixels unchanged from one area to another.

A problem with cloning that has not been addressed by any existing image editing system is that the cloning operation can be very painstaking for the user. The operator must take care that the color and brightness of the pixels being copied, the source pixels, match the color and brightness of the pixels surrounding the destination area. If the new pixels differ significantly from the pixels surrounding their new location, the operator will simply have replaced the old artifact with a new one.

One could perhaps measure the average color in the surrounding area and simply paint over the artifact with that color. Unfortunately, natural imagery has a natural texture, provided by film grain if nothing else, and simply painting digitally with a constant color will not produce the same texture. Even if the texture were simulated, the destination region would still have different lighting gradients than its surrounding pixels.

In using a cloning operation, an operator will find a closely matching region as the source for the clone. This usually is not an exact match and there may well be a discernible boundary between the new pixels and the surround. The typical solution to this is to blur the region of the boundary slightly in order to mask the boundary. This achieves usable images at the cost of taking more operator time.

It is seen then that there exists a need for an improved method of adjusting the brightness and color of copied pixels so that they more nearly match the surrounding area, overcoming the problems associated with the prior art.

SUMMARY OF THE INVENTION

This need is met by the improved cloning technique according to the present invention, wherein an automatic technique is used for adjusting the brightness and color of the copied pixels so that they more nearly match the surrounding area.

In accordance with one embodiment of the present invention, the color and brightness of the cloned pixels is automatically adjusted to more nearly match the color and brightness of the area surrounding the cloned pixels. The technique involves fitting a functional model to the data points of the cloned area and also fitting the model to the surrounding area, obtaining two sets of model parameters. The pixel values in the cloned area are then adjusted so that the resulting model parameters match the model parameters for the surrounding area.

It is an object of the present invention to provide a pixel cloning technique for digital retouching of images. It is a further object of the present invention to automatically adjust the color and brightness of the cloned pixels to more nearly match the color and brightness of the area surrounding the cloned pixels. It is an advantage of the present invention that this pixel cloning technique makes the operator more productive.

These and other objects and advantages of the present invention will become more apparent when taken in conjunction with the following description and drawings wherein like characters indicate like parts and which drawings form a part of the present description.

DETAILED DESCRIPTION OF THE PREFERRED EMBODIMENTS

The present invention presents a technique for automatically adjusting the color and brightness of cloned pixels to more nearly match the color and brightness of the area surrounding the cloned pixels. The technique of the present invention involves fitting a functional model to the data points of the cloned area and also fitting the model to the surrounding area, obtaining two sets of model parameters. The pixel values in the cloned area are then adjusted so that the resulting model parameters match the model parameters for the surrounding area.

Although the present invention is described in terms of a two-dimensional quadratic model, as such a model appears to work well in many circumstances, it will be obvious to those skilled in the art that other models could be used as well, without departing from the scope of the invention.

Figure 1:
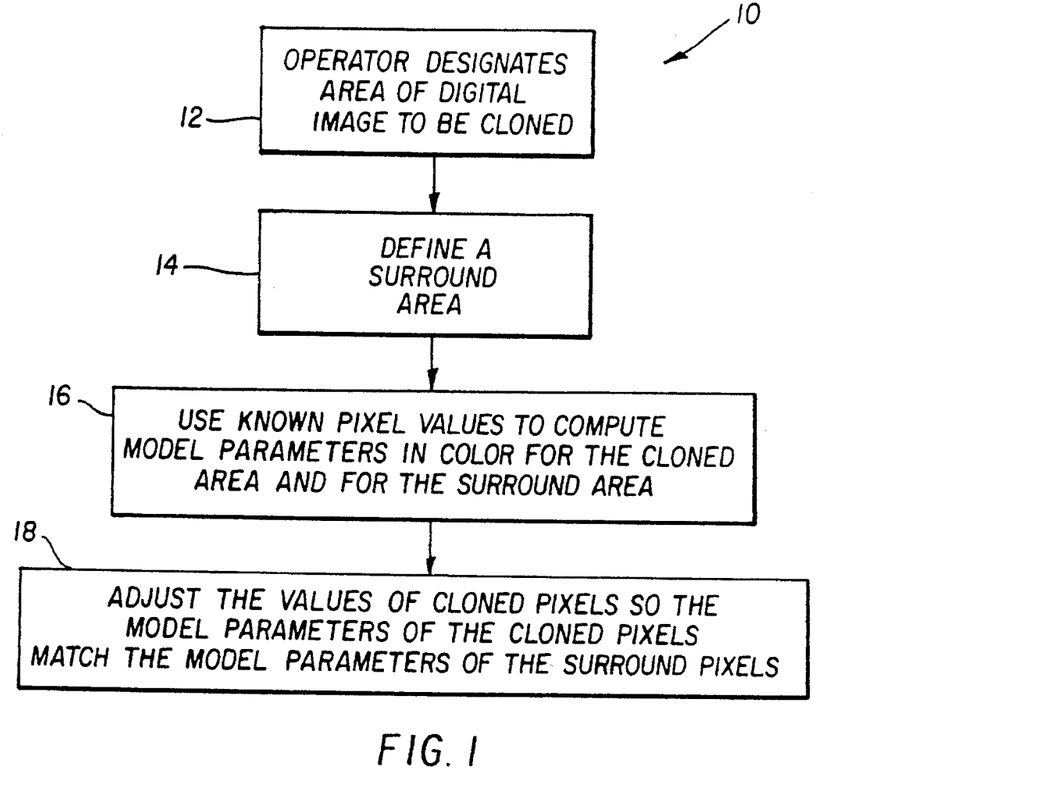
FIG. 1 illustrates a flow diagram showing the sequence of steps for the pixel cloning technique in accordance with the present invention.

Referring now to FIG. 1, a flow diagram 10 showing the sequence of steps for the pixel cloning technique of the present invention is illustrated. Initially, the operator starts with a digital image having known pixel values, and designates an area to be cloned, using a pointing device such as a mouse, as shown in block 12. An area of surrounding pixels is then defined as indicated at block 14, the surround area typically being larger than the cloned area. Using the image pixel values, model parameters, such as mean, slope, and quadratic coefficients, are computed in each color for the cloned area and for the surround area, as shown in block 16. Finally, in block 18, the values of the cloned pixels are adjusted so that their model parameters match correlating parameters of the surround area.

In accordance with one embodiment of the invention, the operator does some cloning on a limited area, but then is able to invoke an "auto-balance" algorithm which would adjust the newly cloned pixels to more closely match the surrounding area. The use of the adjustment would be at the discretion of the operator. If the algorithm is successful, the operator would not need to be as careful in selecting a matching source region and would not need to blur the boundaries of the cloned area in order to mask mismatches in color. This would make cloning a more productive operation. The question then is how to match the cloned area and the surround without losing the texture of either.

Figure 2:
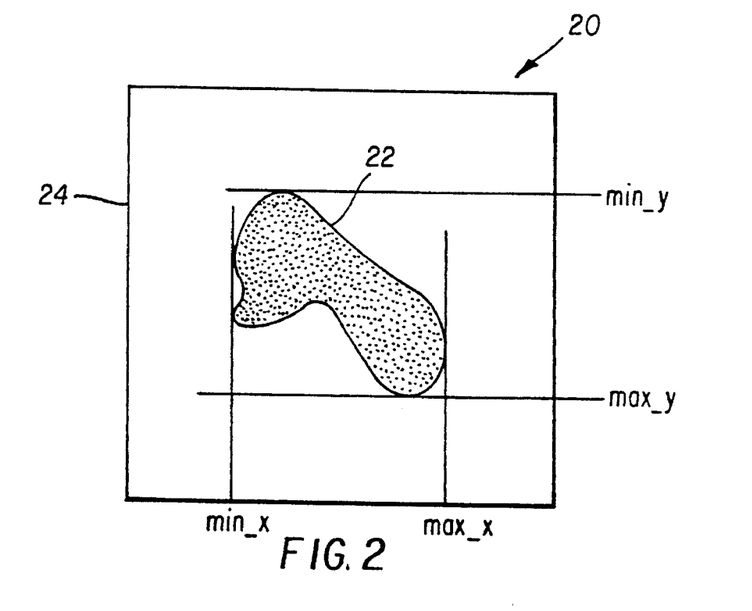
FIG. 2 is a graphical representation of a cloned area and a surround used to achieve the digital image retouching according to the present invention.

Referring now to FIG. 2, a graphical representation 20 of a cloned area 22 and a surround area 24 used to achieve the digital image retouching according to the present invention is illustrated. Coefficients can be estimated separately for each band and for both the cloned region 22 and the surrounding region 24. In FIG. 2, the cloned region 22 consists of all the pixels which were copied. The definition of the surround 24 is somewhat arbitrary. For example, a rectangular region can be used, as illustrated, determined by finding the minimum and maximum extent of the cloned region in the x and y directions, obtaining values for the parameters min_x, max_x, min_y, and max_y. The rectangle constituting the surround region 24 then extends from $$\text{min\_x} - (\text{max\_x} - \text{min\_x})/2 \text{ to } \text{max\_x} + (\text{max\_x} - \text{min\_x})/2$$

in the x direction; and from $$\text{min\_y} - (\text{max\_y} - \text{min\_y})/2 \text{ to } \text{max\_y} + (\text{max\_y} - \text{min\_y})/2$$

in the y direction, with both ranges inclusive. The surround region 24 includes the pixels inside the rectangle, but excludes those which were cloned. With this definition, the size of the surround region 24 is double the size of the cloned region 22 in their maximum x and y extents. Although the surround area 24 is discretionary with the operator, it is generally preferred to have the surround area be as small as possible while still providing sufficient pixels to allow a reasonable estimate of the model parameters of the surround area 24.

Continuing with FIG. 2, a small area of the image can be modeled as a function of the image coordinates, x and y, and a small number of other parameters, denoted by I(x,y,a), where the parameter "a" denotes a set of parameters. This model excludes the texture or noise component of the image, and includes the basic variation in color and brightness. A specific model that only models the slow variations and is invalid at edges of objects within images is given by the equation:

$$I(x,y) = m + g_x * x + g_y * y + g_{xx} * x * x + g_{xy} * x * y + g_{yy} * y * y$$

It is assumed that the pixel values of different color records (that is, different bands) can be modelled independently, with separate sets of parameters for each band. Over a small local region, this assumption of independence of bands will be adequate in almost any color space and for almost any metric, such as, for example, RGB bands and a log exposure metric.

In the equation above, x and y are the image coordinates. If only the first term on the right side is used, the area is being approximated by a constant mean value in each band, a zeroth order model. Using the first three terms approximates the function I(x,y) in this region by a plane, which is a first order model. The slope is determined by the terms $g_x$ and $g_y$, and the curvature is determined by the terms $g_{xx}$, $g_{xy}$, and $g_{yy}$. All six terms together constitute a quadratic function. Using this full equation is the second order model.

These three models have one, three, and six free parameters per band, respectively. The free parameters are the parameters of the model that are estimated from the data, i.e., from the surround area 24 and the cloned area 22. These free parameters need to be estimated from the pixels which constitute the region to which the model is being applied. Given a set of pixels, coefficients are estimated by simple least squares fitting. As will be obvious to those skilled in the art, the equations for the coefficients are easy to derive. However, it should be noted that for small regions and high-order models, the resulting matrices have the potential for being ill-conditioned. In such instances, then, a more robust method, such as singular value decomposition (SVD), for solving the linear equations should be used, although such a method is more time consuming to compute.

Continuing with FIG. 2, it is desired at this point to adjust the cloned pixels so that model parameters or coefficients of the adjusted cloned pixels match model parameters or coefficients of the surround.

In general, a functional model I(x,y,a), in which "x" and "y" are image coordinates, and "a" is a set of parameters, is used to fit the surround and cloned regions, yielding two sets of parameters $a_{surround}$ and $a_{cloned}$. The adjustment to be made to the cloned pixels is then described by the following equation:

$$D(x,y)=I(x,y,a_{surround})-I(x,y,a_{cloned}).$$

In the specific case of a quadratic functional model, the adjustment is accomplished by adding the following quantity to each pixel in the cloned area:

$$D(x,y)=m'+g'_x{}^*x+g'_y{}^*y+g'_{xx}{}^*x^*x+g'_{xy}{}^*y^*y+g'_{yy}{}^*y^*y$$

Here, each primed symbol is the difference between the parameter value for the surround and the corresponding parameter value for the cloned area. After this addition, the values of m, $g_x$, $g_y$, $g_{xx}$, $g_{xy}$, and $g_{yy}$ for the adjusted cloned area will match the values for the surround, but the adjusted cloned area will retain its original texture or noise characteristics.

It should be noted that the location of the origin from which the coordinates of pixels are measured is immaterial. That is, the resulting pixel values will be the same in any case, though the particular values obtained for the parameters will very. However, if the origin of the coordinate system is chosen to be near the cloned area, the values of the coordinates in the sums used to compute the parameters will be smaller. In that case, less precision is needed to accumulate the sums.

Figure 3:
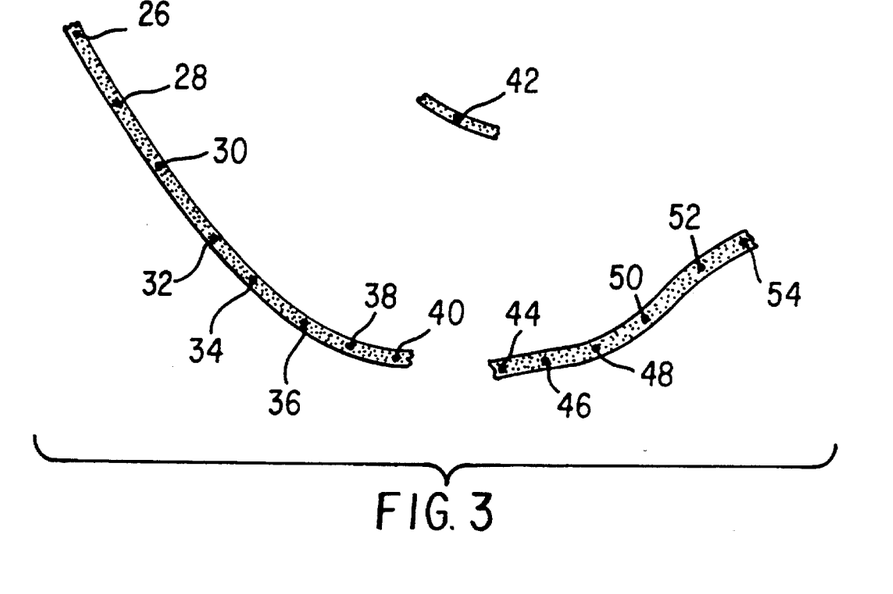
FIG. 3 illustrates a one-dimensional cut through an image having a localized blemish.
Figure 4:
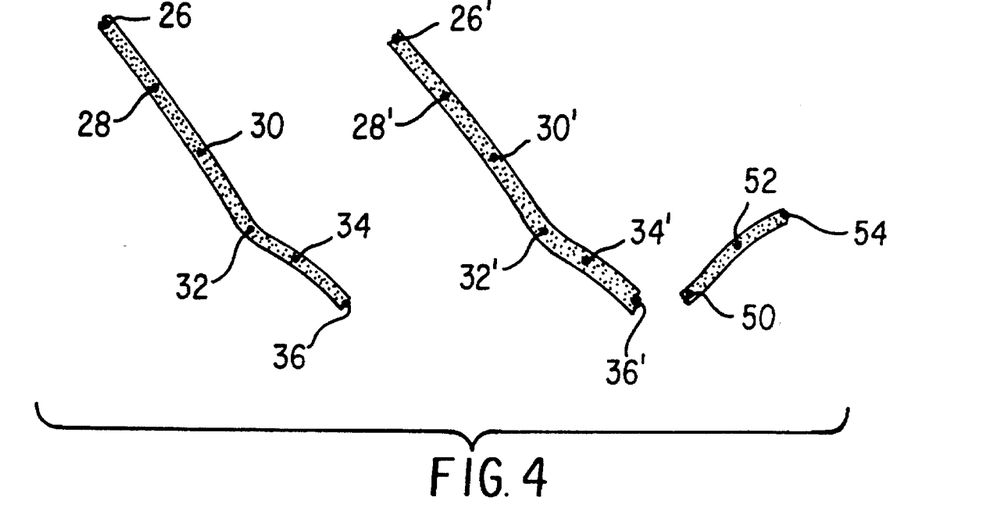
FIG. 4 illustrates the one-dimensional cut of FIG. 3, with a cloned area to replace the blemished area.

FIG. 3 illustrates a one-dimensional example, that is, an example having no y-dependence, for purposes of description only, and is not to be considered as limiting the scope of the invention. The signal illustrated in FIG. 3 is shown with a series of fifteen points, numbered using the even-numbered series from 26 through 54, with one outlying point 42 illustrated as a blemish desired to be retouched. Assuming FIG. 3 as being representative of an intensity profile across some object of an image, the user would clone over the outlying point using some other part of the object. For instance, as illustrated in FIG. 4, points 26 through 36 were copied, or cloned, to replace points 38 through 48 of FIG. 3. That is, points 26–36 of FIG. 3 are duplicated as points 26'–36' in FIG. 4. That yields the plot shown in FIG. 4.

Looking at the plot of FIG. 4, there is clearly a mismatch between the cloned area and its surround. If the surround area is defined to include three points on either side of the cloned area, the surround area in this example would include points 32, 34, 36, 50, 52, and 54.

Figure 5:
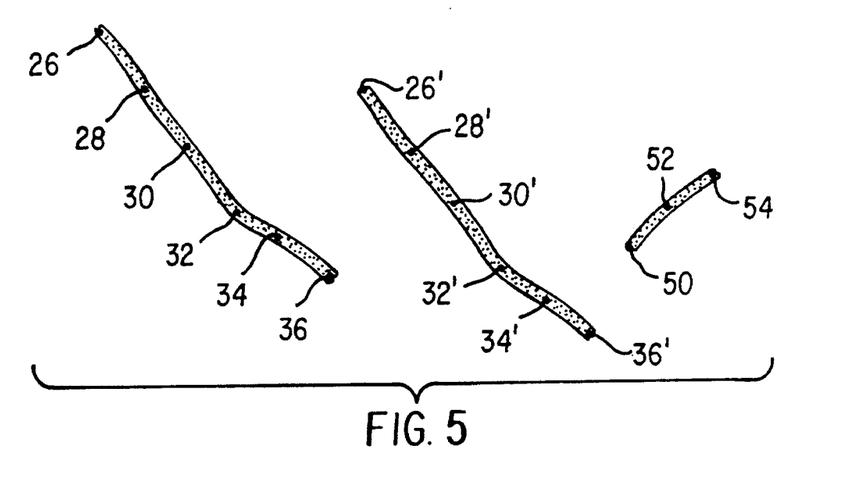
FIGS. 5, 6, and 7 illustrate corrected images wherein adjustments for color, slope, and curvature, respectively, have been applied to the cloned area.
Figure 6:
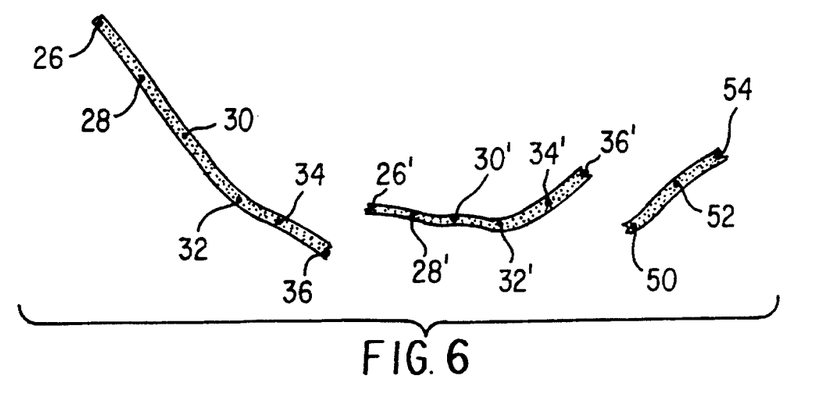
Figure 7:
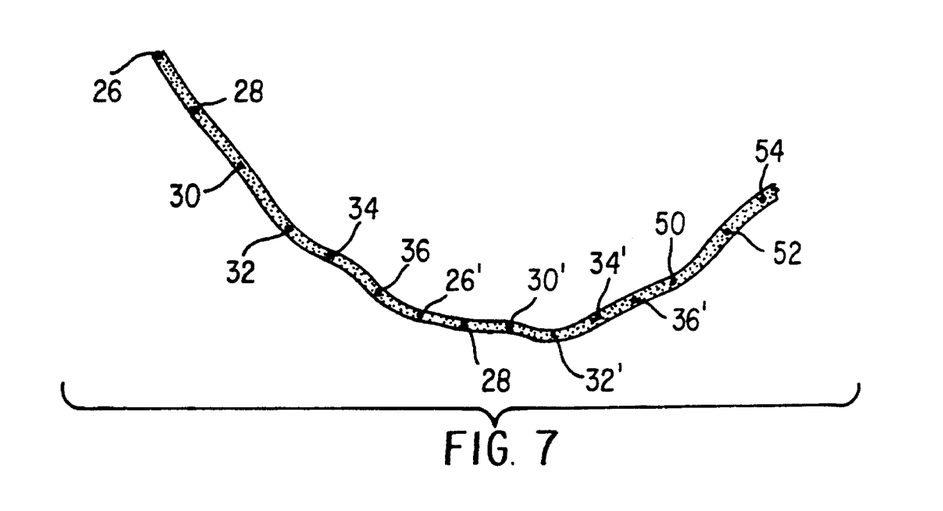
Figure 8A:
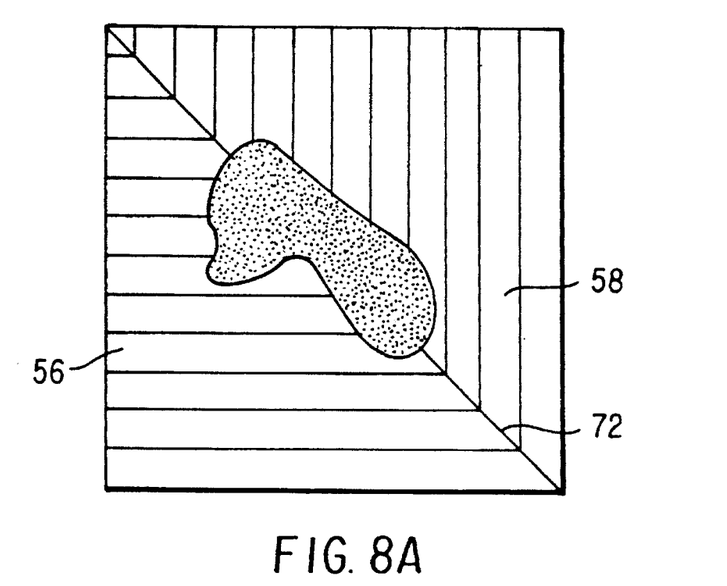
FIGS. 8A, 8B, 8C, and 8D are graphical representations of a surround area divided into multiple subregions to achieve the digital image retouching according to an alternative embodiment of the present invention.
Figure 8B:
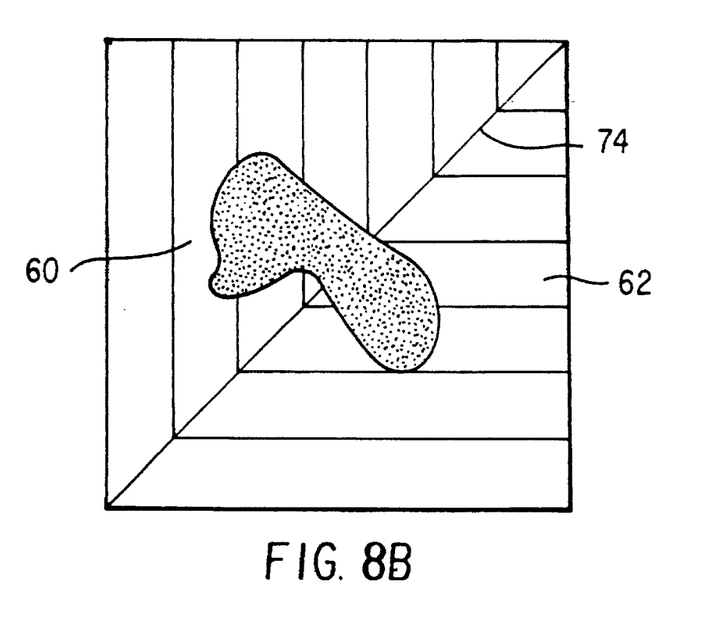
Figure 8C:
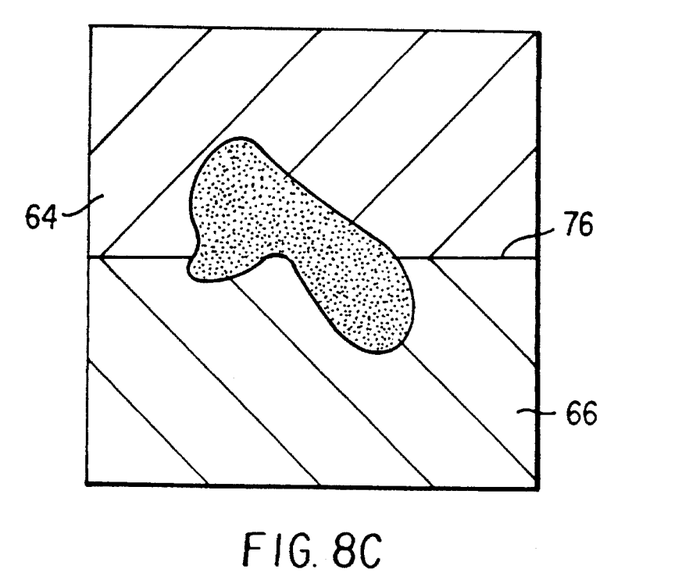
Figure 8D:
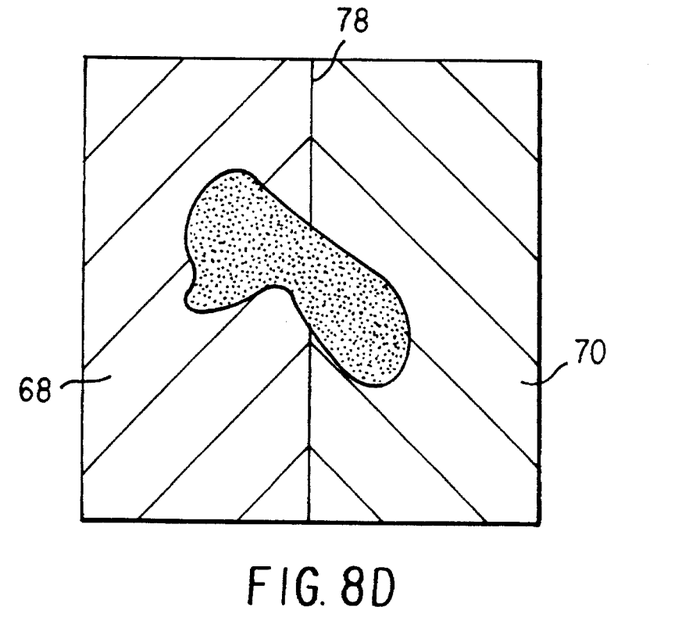

Adjustments can now be applied to the cloned area for the zeroth, first, and second order models, as illustrated in FIGS. 5, 6, and 7, respectively. The model parameters can then be computed using a least squares fitting, well known in the art. With the least squares fitting equation, values for the model parameters are chosen to minimize the deviation between the model and the actual values.

Corrections with the zeroth order model, as shown in FIG. 5 are an improvement over no correction, but still give obvious discontinuities. In FIG. 5, the cloned pixels are shifted to adjust the average or color of the image of points 26'–36' to match that of the surround area shown as points 32–36 and 50–54. However, the shading, or slope, of the resultant plot may still have discontinuities.

The first order model of FIG. 6 is an additional improvement, but for this data the correction is still not adequate. The resultant plot of the first order model of FIG. 6 has an adjusted mean and an adjusted slope, but still has not addressed discontinuities in curvature. The discontinuities in curvature are addressed by the second order model corrections of FIG. 7, which are visually acceptable. The resultant plot of the second order model has an adjusted mean, an adjusted slope, and an adjusted curvature.

An obvious enhancement of this method is to use correction models other than a quadratic. The model could be higher-order polynomial, but it could also be any function of the coordinates and some free parameters, where the free parameters would be fit from the given data and the data points in the cloned area, and adjusted so that the free parameters corresponding to the adjusted cloned area match the free parameters corresponding to the surround area.

As will be obvious to those skilled in the art, the procedure described above works satisfactorily for small compact regions, i.e., regions for which the quadratic model is a reasonable one. It is also possible to apply this technique to long, thin regions such as scratches. In this case one would apply the technique in one dimension only, that is, across the scratch, with the scratch assumed to be oriented roughly vertically. After cloning, for each line of the image which contains part of the scratch, one would fit a one-dimensional model (e.g. a quadratic) to the newly cloned pixels in that line and also fit the model to the surrounding pixels in that line. The cloned pixels would be adjusted as in the two-dimensional case. For other orientations of the scratch, a profile through the scratch would be taken in other directions.

In an alternative embodiment, to accommodate circumstances in which the cloned area is close to an edge in the image, the surround area is divided into subregions and the subregion which best fits the quadratic model is used to estimate the model parameters. This is illustrated in FIGS. 8A–8D, wherein the surround has been divided into multiple subregions, 56–70. Each individual figure, 8A, 8B, 8C, and 8D, is divided into two subregions, split diagonally left to right by dividing line 72, diagonally right to left by dividing line 74, horizontally across a centerline 76, and vertically through a centerline 78, respectively. This allows the cloning technique of the present invention to be applied even if the surround area is not a smoothly varying area. It is possible that the cloned area includes a discontinuity such as an edge. In such a case, the source area will have to be carefully chosen so that the edge in the cloned area matches a similar discontinuity in the surround. In such a situation, attempts to automatically balance the cloned area to match the surround would likely be inappropriate or would need a more complex functional model.

A more common situation is that the cloned area is indeed smoothly varying, but the larger surround area includes a discontinuity. This would happen, for example, if the cloned area extended up to but not across an edge, and the surround area would include the edge. Then the estimates of the offset, slope, and curvature parameters for the surround area would be incorrect. In fact, there is no reasonable low-order, smoothly varying approximation to the surround in such a situation. However, if only data from the surround that is on the same side of the edge as the cloned area were used to estimate the parameters of the surround, then an approximate adjustment to the cloned area could be made.

Although it is possible to attempt a segmentation of the surround region or apply an edge finding routine to select those pixels which are sufficiently homogeneous to be modeled by the simple smoothly-varying function, it is simpler and involves much less computation to use a set of fixed regions. In accordance with this embodiment of the present invention, it is suggested to use, for example, eight subregions of the surround area. The surround rectangle has four bisectors: a horizontal bisector, a vertical bisector, and two diagonals. Each bisector divides the surround area into two regions, defining eight regions in all. If every pixel within the surround rectangle were included, the eight regions would all have the same size, ignoring slight differences caused by a rectangle wherein the width or height of the rectangle has an odd number of pixels. However, since the cloned area is excluded and this cloned area can be an irregular shape, the actual numbers of pixels in each of the eight subregions of the surround area does vary.

At this point, the operator can decide whether to use the model parameters from the full surround area or any one of its eight subregions. That choice is made on the basis of goodness of fit, that is, on the basis of which region the slowly-varying model best describes the pixel values in the region. The classic measure of goodness of fit is the mean-squared deviation of the pixel values in the region from the pixel values predicted by the model using the best fit parameters for that model. Note that an exact fit is not expected; since it is known that the model is not exact, it is expected that there will be noise and texture which contribute to deviations from the model.

In accordance with another embodiment of the present invention, it is possible to use the weighted average of the subregions and the full surround area based on the goodness of fit. If the mean-squared deviation for a subregion is high, it would get a low weight. Conversely, if the mean squared deviation is low, it would get a high weight. Typically the weight would be computed by an exponential such as weight=exp (−mse/noise)

where the "noise" value is an estimate of the typical variation in a smooth region. With weights applied to each subregion, the matrix and vector coefficients obtained from each subregion in the process of computing the model parameters would be first combined and the weighted average of the coefficients from all the subregions and the full surround area would be used in computing model parameters.

Pixel cloning is a common operation in digital retouching of images. However, it is time-consuming partly because of the need to select a source area for the clone which closely matches the color and brightness of the area surrounding the destination. The present invention presents a new technique for automatically adjusting the color and brightness of the cloned pixels. The technique involves fitting a functional model to the data points of the cloned area and also fitting the model to the surround area, obtaining two sets of model parameters. The pixel values in the cloned area are then adjusted so that the resulting model parameters match the model parameters for the surrounding area.

Although the present invention is described in conjunction with a two-dimensional quadratic model, it will be obvious to those skilled in the art that other models could be used as well, without departing from the scope of the invention. To accommodate circumstances in which the cloned area is close to an edge in the image, the surround area is divided into subregions and the subregion which best fits the quadratic model is used to estimate the model parameters. Obviously, a variety of other enhancements could be implemented including: choosing to use the full surround area for cases in which the full surround area is reasonably well fit by the model; using a weighted average of the full surround area and all of the subregions; using models with other functional forms; applying the technique in one-dimension to long, thin cloned regions.

INDUSTRIAL APPLICABILITY AND ADVANTAGES

The present invention is useful in the field of photographic images and has the advantage of automatically adjusting copied pixels to more nearly match the surround. This is accomplished by automatically adjusting the color and brightness of the cloned pixels to more nearly match the color and brightness of the area surrounding the cloned pixels. The invention provides the further advantage of providing a pixel cloning technique for digital retouching of images. Finally, it is an advantage of the present invention that this pixel cloning technique makes the operator more productive.

While there has been shown what is considered to be the preferred embodiments of the invention, it will be manifest that many changes and modifications may be made therein without departing from the essential spirit of the invention. In particular, it will be obvious to those skilled in the art that the embodiment described herein in terms of a two-dimensional quadratic model may be accomplished with a variety of other models as well, without departing from the scope of the invention as defined in the claims. It is intended, therefore, in the annexed claims, to cover all such changes and modifications as may fall within the true scope of the invention.

I claim:

1. A pixel cloning method for digital image retouching of a digital image having known image pixel values, the method comprising the steps of:

selecting an area to be corrected, the area to be corrected being a cloned area;

defining a surround area based on the cloned area;

using the known image pixel values to determine model parameters of a quadratic functional model in each color for the cloned area and for the surround area to create cloned parameters and surround parameters; and adjusting values of the cloned pixels so that the cloned parameters match the surround parameters.

2. A pixel cloning method as claimed in claim 1 wherein the cloned parameters and the surround parameters comprise mean, slope, and quadratic terms.

3. A pixel cloning method as claimed in claim 3 further comprising the step of dividing the surround area into a plurality of subregions.

4. A pixel cloning method as claimed in claim 3 wherein the step of using the known image pixel values to determine model parameters of a functional model in each color comprises the step of using the known image pixel values to determine model parameters of a functional model in each color for the cloned area and for each of the plurality of subregions of the surround to create cloned parameters and subregion parameters.

5. A pixel cloning method as claimed in claim 4 further comprising the step of determining which subregion of the surround deviates the least from the functional quadratic model.

6. A pixel cloning method as claimed in claim 5 wherein the step of adjusting values of the cloned pixels so that the cloned parameters match the surround parameters further comprises the step of adjusting values of the cloned pixels so that the cloned parameters match the subregion parameters of the subregion which deviates the least from the functional model.

7. A pixel cloning method as claimed in claim 6 wherein the cloned parameters and the subregion parameters comprise mean, slope, and quadratic terms.

8. A pixel cloning method as claimed in claim 7 wherein a goodness of fit is defined for a region of the functional model which best describes the pixel values in that region.

9. A pixel cloning method as claimed in claim 8 further comprising the step of using a weighted average of the plurality of subregions and the full surround area based on the goodness of fit.

10. A pixel cloning method for digital image retouching of a digital image having known image pixel values, the method comprising the steps of:

selecting an area to be corrected, the area to be corrected being a cloned area;

defining a surround area based on the cloned area;

dividing the surround area into a plurality of subregions;

using the known image pixel values to determine model parameters of a functional model in each color for the cloned area and for each of the plurality of subregions of the surround area to create cloned parameters and subregion surround parameters;

determining which subregion of the surround deviates the least from the functional model, to define a preferred subregion; and adjusting values of the cloned pixels so that the cloned parameters match the preferred subregion parameters.

11. A pixel cloning method as claimed in claim 10 wherein the step of using the known image pixel values to determine model parameters of a functional model in each color for the cloned area and for each of the plurality of subregions of the surround area to create cloned parameters and subregion surround parameters, further comprises the step of using the known image pixel values to determine model parameters of a functional model in each color for the surround area to create surround parameters.

12. A pixel cloning method as claimed in claim 11 wherein a goodness of fit is defined for a region of the functional model which best describes the pixel values in that region.

13. A pixel cloning method as claimed in claim 12 further comprising the step of using a weighted average of the plurality of subregions and the full surround area based on the goodness of fit.

14. A pixel cloning method as claimed in claim 10 wherein the functional model comprises a quadratic model.

15. A pixel cloning method as claimed in claim 10 wherein the functional model comprises a linear model.

16. A pixel cloning method as claimed in claim 10 wherein the functional model comprises a constant model.

17. A pixel cloning method for digital image retouching of a digital image having known image pixel values, the method comprising the steps of:

selecting an area to be corrected, the area to be corrected being a cloned area;

defining a surround area based on the cloned area;

using the known image pixel values to determine model parameters of a functional linear model in each color for the cloned area and for the surround area to create cloned parameters and surround parameters; and adjusting values of the cloned pixels so that the cloned parameters match the surround parameters.

18. A pixel cloning method as claimed in claim 17 wherein the cloned parameters and the surround parameters comprise mean and slope values.

19. A pixel cloning method for digital image retouching of a digital image having known image pixel values, the method comprising the steps of:

selecting an area to be corrected, the area to be corrected being a cloned area;

defining a surround area based on the cloned area;

using the known image pixel values to determine model parameters of a constant functional model in each color for the cloned area and for the surround area to create cloned parameters and surround parameters; and adjusting values of the cloned pixels so that the cloned parameters match the surround parameters.

20. A pixel cloning method as claimed in claim 19 wherein the cloned parameters and the surround parameters comprise mean values.

* * * * *